(12) United States Patent
Singer et al.

(10) Patent No.: US 8,761,671 B2
(45) Date of Patent: Jun. 24, 2014

(54) DATA MERGING FOR BLUETOOTH DEVICES

(75) Inventors: Steven Singer, Cambridge (GB); Allan Bogeskov, Cambridge (GB)

(73) Assignee: Cambridge Silicon Radio Limited, Cambridge (GB)

(*) Notice: Subject to any disclaimer, the term of this patent is extended or adjusted under 35 U.S.C. 154(b) by 200 days.

(21) Appl. No.: 13/267,411

(22) Filed: Oct. 6, 2011

(65) Prior Publication Data

US 2013/0090063 A1    Apr. 11, 2013

(51) Int. Cl.
*H04B 7/00* (2006.01)
(52) U.S. Cl.
USPC ....... 455/41.2; 455/556.1; 455/557; 370/357; 370/359
(58) Field of Classification Search
USPC ......... 455/41.2, 41.3, 556.1, 556.2, 557, 558; 370/352, 357, 359
See application file for complete search history.

(56) References Cited

U.S. PATENT DOCUMENTS

| | | | | |
|---|---|---|---|---|
| 7,675,537 | B2* | 3/2010 | Wilson et al. | 348/14.01 |
| 7,801,561 | B2* | 9/2010 | Parikh et al. | 455/557 |
| 8,073,389 | B2* | 12/2011 | Zhou et al. | 455/41.2 |

* cited by examiner

*Primary Examiner* — Tuan H Nguyen
(74) *Attorney, Agent, or Firm* — RatnerPrestia

(57) ABSTRACT

A device having a first processing system for providing the functionality of the upper layers of a Bluetooth stack, including a first L2CAP layer, a Bluetooth Controller for providing the functionality of the lower layers of the Bluetooth stack, the first processing system and the Bluetooth Controller being connected by a Host Controller Interface (HCI), a second processing system including an implementation of a second L2CAP layer for transmission of data to the Bluetooth Controller for transmission over a Bluetooth Link established by the first processing system and L2CAP layer, and the first processing system being configured to distribute flow-control tokens between the first and second L2CAP layers both layers can transmit data to a remote device using the Bluetooth Link.

2 Claims, 5 Drawing Sheets

DATA MERGING FOR BLUETOOTH DEVICES

BACKGROUND

The current invention relates to techniques for merging data for transmission within a Bluetooth® system, and in particular to techniques for performing such merging at layers below the Logical Link Control and Adaptation Protocol (L2CAP). layer.

The Bluetooth radio system is a set of standards defining the operation of radio devices such that communication can be established between devices in a standardised fashion.

As part of the Bluetooth standards, the Bluetooth stack is defined, which is a set of layers through which data is passed, each layer performing particular functions to ensure a communications link functions. The layers of the stack may be implemented in a single device, but may also be split between devices.

It is a common requirement to share a single Bluetooth radio link between different data sources or sinks The L2CAP layer of the Bluetooth stack provides for the multiplexing of data onto a single radio link. However, if the Bluetooth stack is split across more than one device, the L2CAP layer may be implemented in a device which cannot conveniently accept data from other devices for multiplexing.

There is a therefore a requirement for a technique to allow multiplexing on a Bluetooth link without requiring access to the L2CAP layer of the Bluetooth stack.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

There is provided a device having a first processing system for providing the functionality of the upper layers of a Bluetooth stack, including a first L2CAP layer, a Bluetooth Controller for providing the functionality of the lower layers of the Bluetooth stack, the first processing system and the Bluetooth Controller being connected by a Host Controller Interface (HCI), a second processing system including an implementation of a second L2CAP layer for transmission of data to the Bluetooth Controller for transmission over a Bluetooth Link established by the first processing system and L2CAP layer, and the first processing system being configured to distribute flow-control tokens between the first and second L2CAP layers both layers can transmit data to a remote device using the Bluetooth Link.

There is also provided a method of multiplexing data in a Bluetooth transmitter, the transmitter comprising a first processing system providing the functionality of the upper layers of a Bluetooth stack, including a first L2CAP layer, a Bluetooth Controller for providing the functionality of the lower layers of the Bluetooth stack and a second processing system including an implementation of a second L2CAP layer, the method comprising the steps of the first processing system receiving from the Bluetooth Controller an indication of available capacity; and the first processing system utilising the indication of available capacity from the Bluetooth Controller to indicate an available capacity to the first and second L2CAP layers.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
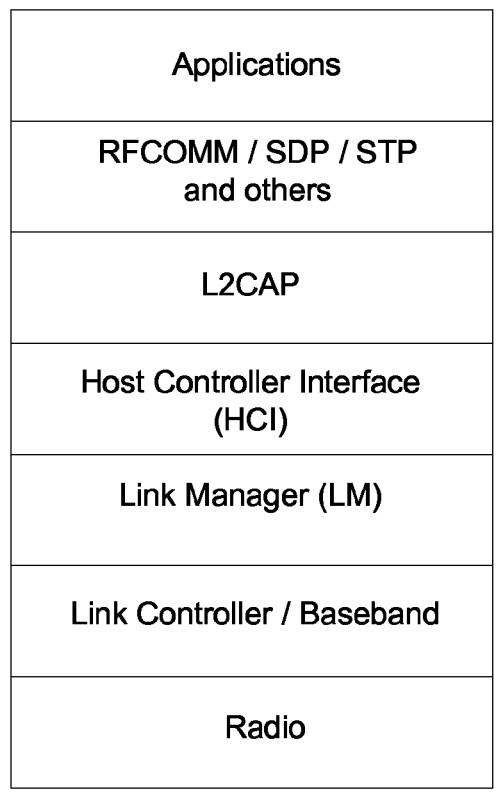
FIG. 1 shows a diagram of the Bluetooth stack.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

Figure 2:
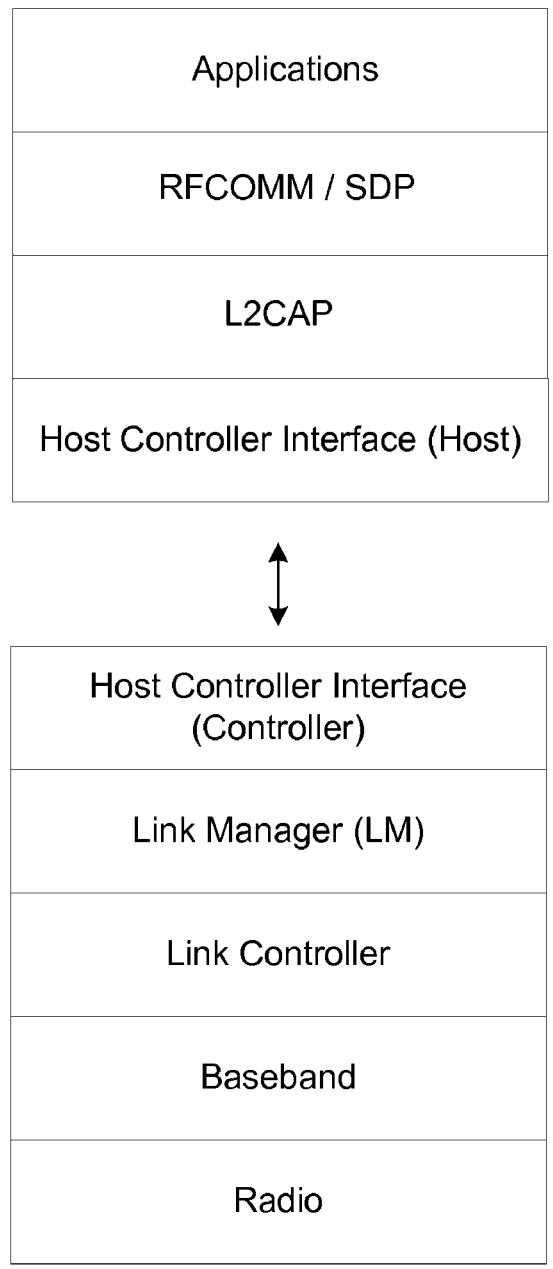
FIG. 2 shows a diagram of a Bluetooth stack split between the two devices at the HCI layer.

FIG. 1 shows a diagram of the Bluetooth stack. FIG. 2 shows a diagram of a Bluetooth stack implementation in which the L2CAP and higher layers are located on a host processor and the lower layers are located on a separate processor, for example a microchip providing Bluetooth services (the Bluetooth controller). The two layers are connected by the host Controller Interface (HCI).

Figure 3:
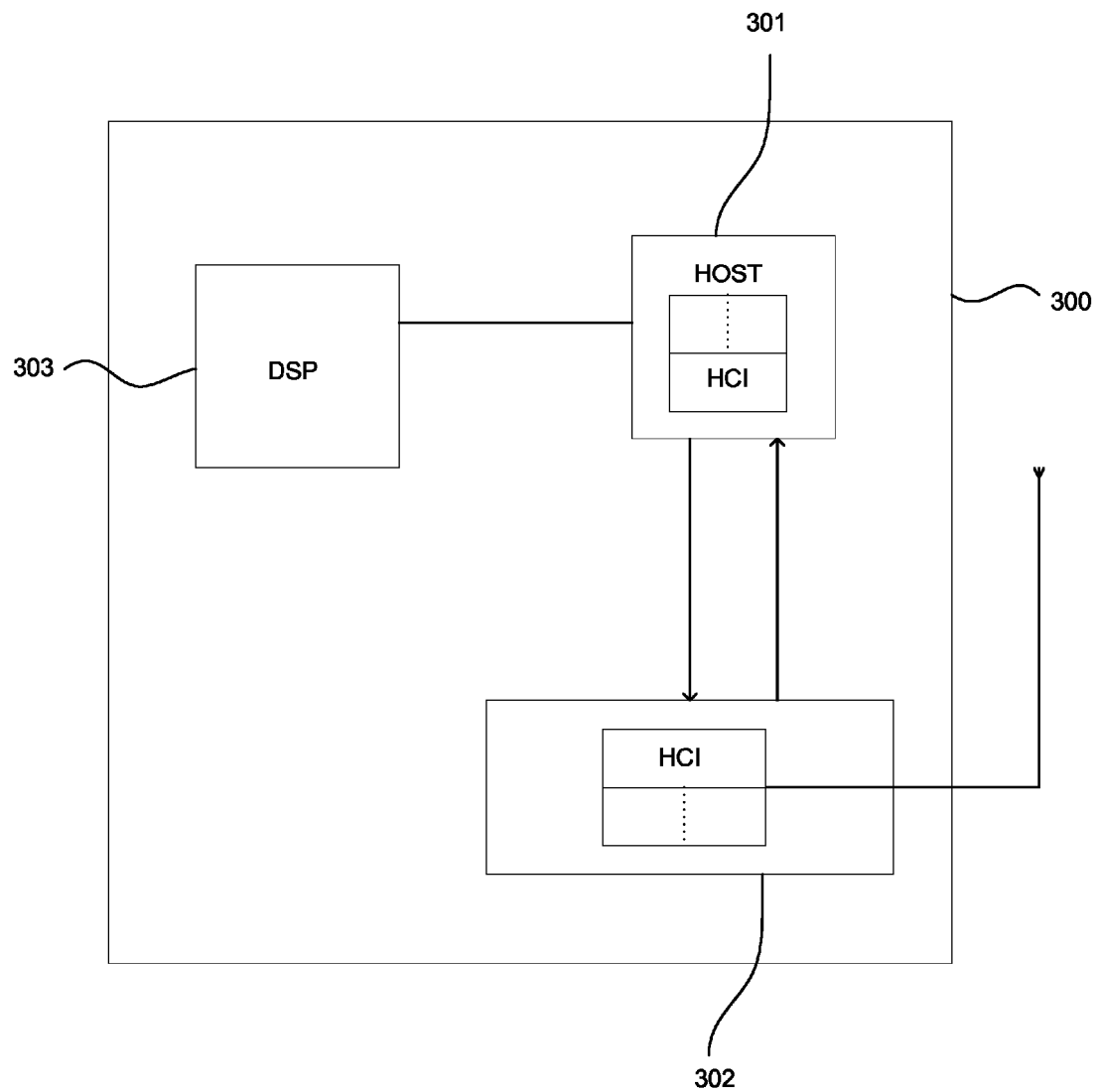
FIG. 3 shows a schematic diagram of a device having a Bluetooth stack between two devices.

FIG. 3 shows a schematic diagram of a device on which the stack implementation of FIG. 2 may be utilized. A device 300 comprises a host processor 301, a Bluetooth controller 302 and a DSP 303. The host processor 301 is a general purpose processor for providing the device, for example a mobile telephone, with its functionality. The general purpose host processor 301 may be inefficient at particular tasks, for example decoding compressed audio for playback over a Bluetooth link. However, the DSP 303 can be configured to perform such tasks more efficiently, thereby decreasing power consumption. In order to transmit the decoded audio information (or other data generated by the DSP 303) via the Bluetooth link, the DSP 303 requires access to the Bluetooth stack at an appropriate layer to multiplex the audio data into the Bluetooth data flow. The L2CAP layer is the logical point in a Bluetooth system to perform this multiplexing, since that layer is responsible for forming data links with remote devices. However, that layer resides on the host processor, and so the DSP must be connected to the host, and the host must be active to accept and process the data.

While the DSP 303 is being used for audio playback, it is possible that the host processor is performing very little, or no, other processing and so could be partially or fully sent to sleep to conserve power. However, the host must remain awake to provide the L2CAP functionality for multiplexing. As explained above, there is therefore a need for a technique to allow multiplexing below the L2CAP layer. This is generally not simple to implement because data links in the Bluetooth standard are 1:1 below the L2CAP layer thereby making multiplexing into those data links difficult whilst maintaining flow-control and link integrity.

Modification of the host L2CAP implementation is often difficult as the layer may be very tightly controlled to prevent the introduction of errors, it may be sourced from a third party, or an understanding of the operation may have been lost. It is therefore desirable that any improved multiplexing capability is provided without the requirement to modify the L2CAP layer.

In contrast to the L2CAP layer, the Host Controller Interface is generally a modifiable part of the stack implementation. Often the HCI is provided in a modular format such that a module providing the functionality for the particular link utilised by the device can be inserted. This allows a common implementation of much of the Bluetooth stack to be utilised on a range of devices with differing protocols and transport forms used in the HCI.

Figure 4:
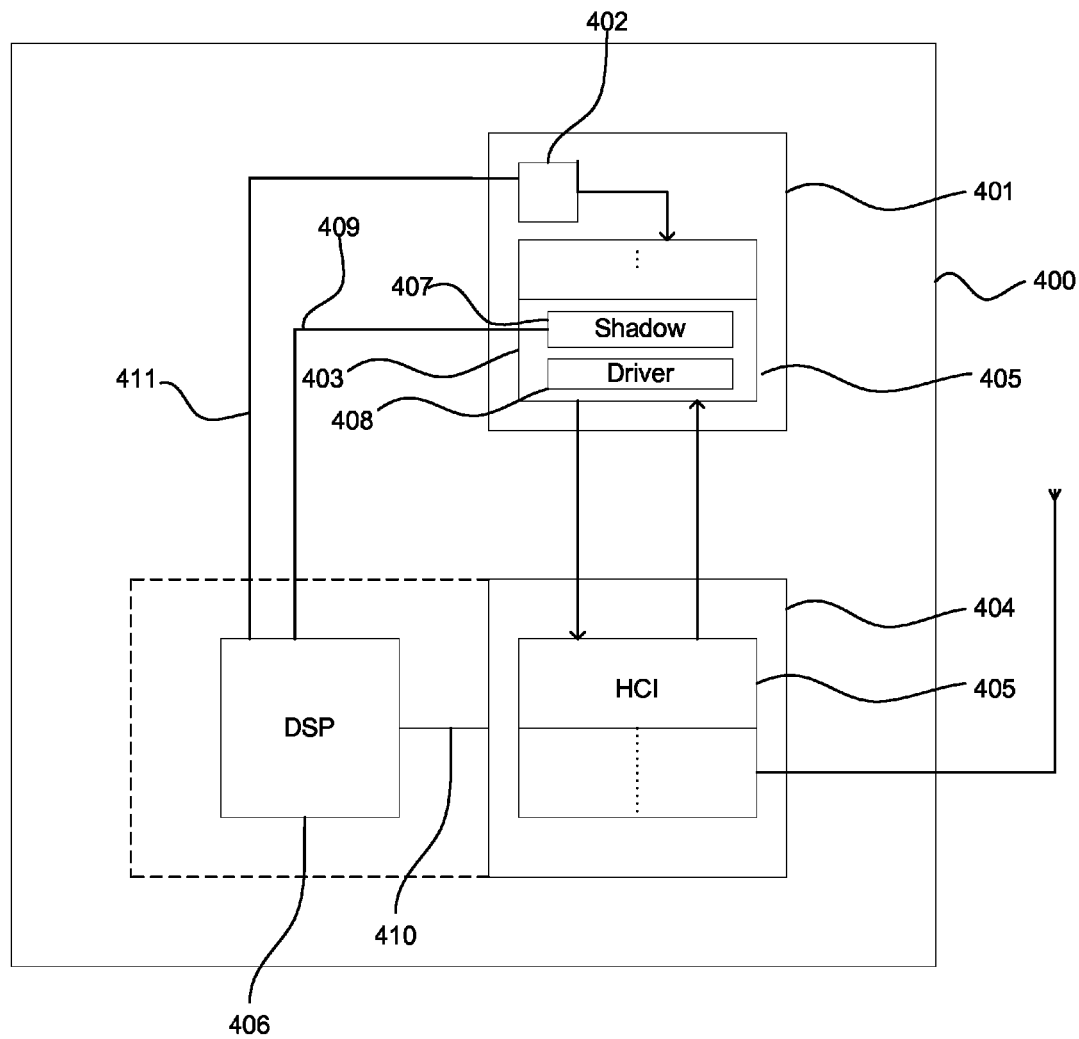
FIG. 4 shows a schematic diagram of a Bluetooth device for multiplexing data.

FIG. 4 shows a schematic diagram of a device 400 in which a multiplexing system according to the current disclosure may be implemented. Host processor 401 comprises the layers of the Bluetooth stack 403 from L2CAP upwards, and a processing application 402 for providing data to the Bluetooth stack for transmission over a Bluetooth link. Processing application 402 may pass its output data to the Bluetooth stack for processing and transmission in the standard manner.

The host processor is connected to Bluetooth controller 404 by a HCI 405. The host side of the HCI comprises an HCI shadow layer 407 and a driver 408 for driving the physical link to the Bluetooth controller 404. Bluetooth controller 404 also provides the lower levels of the Bluetooth stack. A DSP 406 is provided for performing customized processing. DSP 406 may be provided as part of the same package or processor as the Bluetooth controller 404, or may be separate. The use of the term DSP is not intended to restrict that device to any particular type of processor. Any device(s) suitable for providing the controller and/or DSP functionality may be utilised to implement those components. DSP 406 is connected 410 to the Bluetooth controller 404 to allow transmission of data between the DSP and the controller 404 for transmission over the Bluetooth link. A communications channel 411 is provided between the processing application 402 and the DSP to allow control of the DSP by the Host. For example, processing application 402 may provide user interface and control functions of an audio playback application, and the DSP 406 may provide the actual decoding functionality of that application. The processing application controls the DSP 406 to provide playback of the files as selected by the user in the user interface. A further communications channel 409 is provided between the shadow layer 407 and the DSP 406 to allow flow control systems to be implemented, as explained below.

The shadow layer is provided to implement a flow control mechanism which allows tokens from the Bluetooth controller to be shared between the Host L2CAP layer and a comparable layer in the DSP. This sharing allows the use of a common Bluetooth link between two elements of the local device, thereby achieving multiplexing without modification of the Host L2CAP layer. The shadow layer operates by delegating tokens in a predefined manner to the DSP to allow transmission of data from the DSP. Control of the setting up and maintenance of the Bluetooth link remains with the host Bluetooth stack and so there is no modification of the standard Bluetooth implementation in the Host, other than the HCI.

Figure 5:
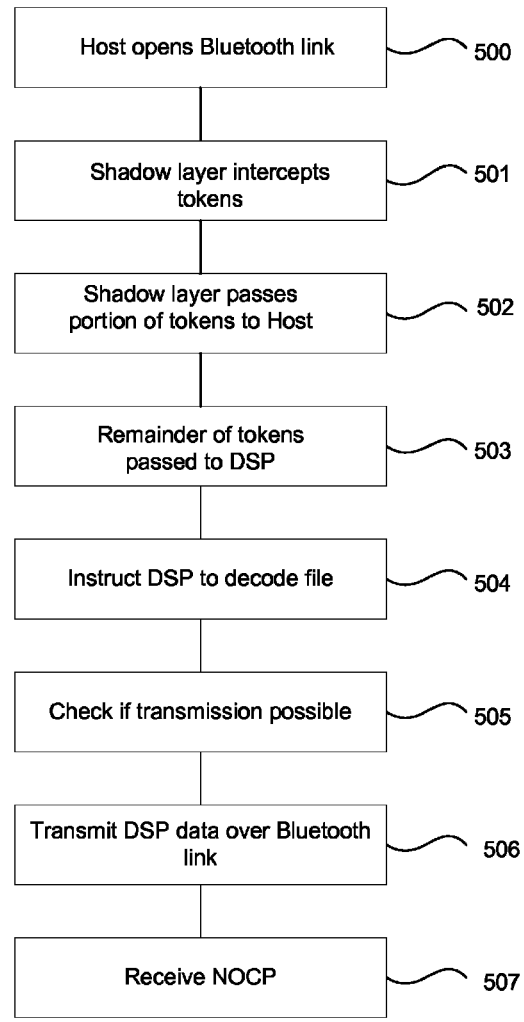
FIG. 5 shows a flow chart of a method of data multiplexing in a Bluetooth stack.

FIG. 5 shows a flowchart of a method of operating a device shown in FIG. 4. At block 500 the Host opens a communications link with a remote device and the Bluetooth controller informs the Host L2CAP of the number of tokens available for that link. These tokens may be transmitted from the Bluetooth controller, for example, in the form of a response to a 'read buffer size' command issued by the Host. The response may not explicitly be in the form of a number of tokens, but may be an indication of size. The size can be simply converted to the number of tokens or packets to which it corresponds. For convenience this description is given by reference to the passing of tokens between entities, but as will be appreciated any known method of flow control may be utilised to implement the principles described herein.

In an example, 10 tokens may be sent by the Bluetooth Controller, but the number of tokens is determined according to standard procedures for the Bluetooth system. At block 501 the shadow layer intercepts the tokens before the Host L2CAP layer is aware of them. At block 502 the shadow layer passes a proportion of the tokens to the Host L2CAP layer, and at block 503 the remaining tokens are delegated to the DSP for use for transmission of data from the DSP over the Bluetooth link. An L2CAP layer may be implemented in the DSP for a convenient implementation of the functions needed for the transmission of data over the link.

For example, the shadow layer may receive 10 tokens from the Bluetooth controller. Two of those tokens may be sent to the Host L2CAP layer and the remaining 8 tokens may be sent to the DSP. The ratio of tokens between the Host and DSP is defined according to the relative priorities and quantity of data for transmission for the two elements. The total number of tokens in circulation does not exceed the number issued by the Bluetooth controller and therefore there is no requirement for additional flow control to prevent overflow of the buffers in the Bluetooth Controller.

At block 504 the processing application instructs the DSP to begin decoding a file and transmitting the decoded data over the Bluetooth link. The DSP begins that decoding and transmits packets of data to the Bluetooth Controller for transmission, utilising the tokens it has available.

At block 505 the Bluetooth Controller checks that the packets can be transmitted. If the Bluetooth Controller is transmitting a sequence of packets from the Host, then according to the Bluetooth Standard, that sequence cannot be interrupted until it has finished. Once the sequence is complete, the Bluetooth Controller accepts the packets and transmits them at block 506 to the remote device. The remote device is not aware that the packets have originated from a different source since they are transmitted as part of the link set up by the Host.

At block 507 the Bluetooth Controller receives an indication that packets have been correctly received at the remote device. The Bluetooth Controller determines whether those packets were from the Host or the DSP and transmits a Number Of Completed Packets (NoCP) signal to the relevant element.

The DSP may continue to transmit data using the tokens delegated to it until the task is completed or other instructions are received from the processing application. If the Host wishes to make a transmission it has access to the tokens passed to it by the Shadow Layer and can transmit data using them, subject to the checks by the Bluetooth Controller not to interrupt a sequence of packets from the DSP. The Host may also signal to the DSP to stop transmitting data to allow the Host to transmit its data.

The above method allows the transmission of data from the DSP over a Bluetooth link without any input from the Host. Once the tokens are delegated to the DSP it can operate autonomously, sending data to the Bluetooth controller for transmission. In order to reduce power consumption the Host can thus sleep, or partially sleep, during the transmission process. The Host may wake intermittently to perform control or other functions.

The method shown in FIG. 4 is transparent to the Host and so no modification of the upper layers of the Bluetooth stack are required. However, the permanent delegation of tokens may lead to sub-optimal transmission of data by restricting the tokens available to one element and thereby reducing data transfer rates. For example, at start-up most of the tokens may be delegated to the DSP in the expectation that the DSP has a larger requirement for transmitting data. However, if the Host actually wishes to send more data than the DSP, that transmission will be limited by the restricted tokens available to Host, while the excess tokens of the DSP will not be fully utilised. The communications channel 409 may be utilised to alter the distribution of tokens during operation of the system.

In an alternative method of delegating tokens, the shadow layer may pass all of the tokens issued by the Bluetooth Controller to the Host. The shadow layer also delegates a predefined number of tokens to the DSP such that the total number of tokens in circulation exceeds the number issued by the Bluetooth controller. In order to prevent overflow of buffers in the Bluetooth Controller the shadow layer also implements a further level of flow control. To implement this the Shadow layer monitors use of tokens by both the DSP and the host. If the Shadow layer is aware that the maximum number of tokens is in use and the Host requests a further transmission, those packets are held in the shadow layer until a token is available to allow the transmission. Negotiation is required between the Shadow layer and DSP to prevent the DSP using those tokens simultaneously and overloading the buffers.

For example, the Bluetooth Controller may issue 10 tokens and 2 tokens may be delegated to the DSP. If the Host attempts to transmit 10 packets, the shadow layer holds 2 of those packets such that even if the DSP has 2 tokens in use, there are still only a total of 10 tokens in use in the Bluetooth controller. Once the shadow layer receives completed packet indications the packets are released for transmission.

When this technique is implemented the link may appear slow to the host when packets are held in the shadow layer. Although the added delay is, at its maximum, equal to the transmission time for the number of tokens delegated to the DSP, care is required to ensure the host does not assume the link has failed due to timeout issues.

In a further alternative the shadow layer does not delegate any tokens to the DSP, but when the Host transmits data on a link, the NOCP signals are intercepted. Those signals are utilised to indicate to the DSP how many packets it may transmit since it is known that the tokens to which the NOCP relates will not be reused by the Host until the Host receives the NOCP signal. The NOCP signals thereby provide a source of tokens for the DSP to use to transmit data.

A disadvantage of this approach is that the NOCP signal that is intercepted by the shadow layer relates to real data transmitted by the Host. The Host does not thus have a correct record of which packets have been received by the remote device. In the absence of receipt of a NOCP for a packet the Host may assume that the link has failed and that no further data can be transmitted over that link. Also, the Host does not have a correct record of the state of the Bluetooth device. Furthermore, the DSP is reliant on the Host transmitting data to allow it to transmit data. If the Host opens a link but does not transmit any data over it no NOCP signals will be received and so the DSP will not be able to transmit any data.

As will be appreciated by the skilled person the methods described above in relation to the decoding of an audio file may be applied to other functionality which requires the transmission of data over a Bluetooth link. The function may not be one that requires processing of data by the DSP, but could be, for example, the transmission of large amount of data from storage a device to a remote device. The DSP may be utilised to access the data in the storage device and transmit it over the Bluetooth Link. During that process the Host may enter a sleep mode.

The Shadow Layer may also be implemented at other locations in the system as may be most efficient. For example, it may be implemented at the Bluetooth Controller side of the HCI, or may be implemented below the HCI driver. Depending on its location, the Shadow Layer may have to remove outer headers to access the data it requires to distribute tokens, and subsequently reapply those headers and footers to allow continued transmission of the packets.

The use of the word multiplexing is not intended to indicate that there are necessarily multiple data streams through the Bluetooth system. Rather it is used as a convenient word to include insertion of a sole data stream or the multiplexing of data.

Suitable methods must be provided for use to terminate the process when the DSP ceases producing data for transmission, for example at the end of an audio track. Communication between the DSP and host, similar to that used during set up of the system, may be utilised to stop the generation of packets when the DSP has transmitted all of its data. In the later methods where a large number of tokens are delegated to the controller, the DSP may indicate to the host that it has used all of the tokens for which it has a requirement and returns the unneeded tokens to the host.

The description herein has been given in relation to implementation of the method in a Bluetooth. However, as will be appreciated by the skilled person, the invention is also applicable to other communications systems which use a similar stack structure to the Bluetooth structure. The Bluetooth stack is closely related to the OSI stack, as are many standard stack structures, and so it is likely that the invention could easily be transplanted to those other systems.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise and exclusive list and a method or apparatus may contain additional blocks or elements.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

What is claimed is:

1. A device having
   a first processing system for providing the functionality of the upper layers of a Bluetooth stack, including a first Logical Link Control and Adaptation Protocol (L2CAP) layer,
   a Bluetooth Controller for providing the functionality of the lower layers of the Bluetooth stack, the first processing system and the Bluetooth Controller being connected by a Host Controller Interface (HCI),
   a second processing system including an implementation of a second L2CAP layer for transmission of data to the Bluetooth Controller for transmission over a Bluetooth Link established by the first processing system and L2CAP layer, and
   the first processing system being configured to distribute flow-control tokens between the first and second L2CAP layers wherein both layers can transmit data to a remote device using the Bluetooth Link.

2. A method of multiplexing data in a Bluetooth transmitter, the transmitter comprising a first processing system providing the functionality of the upper layers of a Bluetooth stack, including a first Logical Link Control and Adaptation Protocol (L2CAP) layer, a Bluetooth Controller for providing the functionality of the lower layers of the Bluetooth stack and a second processing system including an implementation of a second L2CAP layer, the method comprising the steps of
   the first processing system receiving from the Bluetooth Controller an indication of available capacity; and
   the first processing system utilising the indication of available capacity from the Bluetooth Controller to indicate an available capacity to the first and second L2CAP layers.

* * * * *

UNITED STATES PATENT AND TRADEMARK OFFICE
CERTIFICATE OF CORRECTION

| | | |
|---|---|---|
| PATENT NO. | : 8,761,671 B2 | Page 1 of 1 |
| APPLICATION NO. | : 13/267411 | |
| DATED | : June 24, 2014 | |
| INVENTOR(S) | : Singer et al. | |

It is certified that error appears in the above-identified patent and that said Letters Patent is hereby corrected as shown below:

In the Specification

Column 1, Line 10, delete "(L2CAP)." and insert -- (L2CAP) --, therefor.

Column 1, Line 22, delete "sinks" and insert -- sinks. --, therefor.

In the Claims

Column 7, Line 16, Claim 1, delete "having" and insert -- having: --, therefor.

Column 8, Line 16, Claim 2, delete "steps of" and insert -- steps of: --, therefor.

Signed and Sealed this
Third Day of February, 2015

Michelle K. Lee
*Deputy Director of the United States Patent and Trademark Office*